(12) United States Patent
Ustianowski (10) Patent No.: US 11,784,477 B2
(45) Date of Patent: Oct. 10, 2023

(54) WEATHER-RESISTANT ELECTRICAL DEVICE ENCLOSURE

(71) Applicant: NSi Industries, LLC, Huntersville, NC (US)

(72) Inventor: Allen John Ustianowski, Denver, NC (US)

(73) Assignee: NSi Industries, LLC, Huntersville, NC (US)

( * ) Notice: Subject to any disclaimer, the term of this patent is extended or adjusted under 35 U.S.C. 154(b) by 36 days.

(21) Appl. No.: 17/558,754

(22) Filed: Dec. 22, 2021

(65) Prior Publication Data

US 2022/0115852 A1   Apr. 14, 2022

Related U.S. Application Data

(63) Continuation-in-part of application No. 16/257,465, filed on Jan. 25, 2019, now abandoned.

(51) Int. Cl.
| | | |
|---|---|---|
| H02G 3/00 | (2006.01) | |
| H02G 3/08 | (2006.01) | |
| H01R 13/52 | (2006.01) | |
| H04B 1/3888 | (2015.01) | |
| G06F 1/16 | (2006.01) | |
| H04N 23/51 | (2023.01) | |

(52) U.S. Cl.
CPC ......... *H02G 3/088* (2013.01); *H01R 13/5213* (2013.01); *G06F 1/1656* (2013.01); *H04B 1/3888* (2013.01); *H04N 23/51* (2023.01)

(58) Field of Classification Search
CPC .... H02G 3/088; H01R 13/5213; H04N 23/51; G06F 1/1656; H04B 1/3888
See application file for complete search history.

(56) References Cited

U.S. PATENT DOCUMENTS

| | | |
|---|---|---|
| 3,654,663 A | 4/1972 | Algotsson |
| 5,763,831 A | 6/1998 | Shotey et al. |
| 6,441,304 B1 | 8/2002 | Currier et al. |
| | (Continued) | |

FOREIGN PATENT DOCUMENTS

GB       2513831 B      6/2017

OTHER PUBLICATIONS

International Search Report dated Feb. 24, 2023, cited in International Application No. PCT/US22/80676, 10 pages.

*Primary Examiner* — Pete T Lee
(74) *Attorney, Agent, or Firm* — Shumaker, Loop & Kendrick, LLP (57) ABSTRACT

A weather-resistant electrical device enclosure that includes a base defining an interior and a rear wall for being mounted to a supporting structure, at least one opening in the rear wall for receiving an insert plate having an electrical device opening for receiving an electrical device, a forwardly-facing access opening for accessing the interior of the base, and a peripheral front rim surrounding the access opening remote from the rear wall of the base. A cover is pivotally-mounted in relation to the base and movable between a closed position and an open position. The cover includes a peripheral cover flange terminating at an outer edge extending around the cover and outwardly from the peripheral front rim of the base when in the closed position to define a parametrical water-deflecting overhang.

33 Claims, 11 Drawing Sheets

(56) References Cited

U.S. PATENT DOCUMENTS

| | | |
|---|---|---|
| 6,723,922 B1 | 4/2004 | Shotey et al. |
| 6,891,104 B2 | 5/2005 | Dinh |
| 7,439,444 B1 | 10/2008 | Maltby et al. |
| 7,598,453 B1 * | 10/2009 | Shotey .................... H02G 3/14 |
| | | 174/67 |
| 7,939,756 B2 | 5/2011 | Daniels et al. |
| D669,864 S * | 10/2012 | Korcz ......................... D13/156 |
| 8,569,621 B1 * | 10/2013 | Shotey .................... H02G 3/14 |
| | | 174/67 |
| D696,207 S * | 12/2013 | Ott .............................. D13/156 |
| 8,816,200 B1 | 8/2014 | Baldwin et al. |
| 8,899,432 B2 * | 12/2014 | Jolly ....................... H02G 3/14 |
| | | 220/831 |
| 9,362,729 B2 | 6/2016 | Wade et al. |
| 9,608,418 B1 | 3/2017 | Elberbaum |
| 2005/0197019 A1 | 9/2005 | Maltby et al. |
| 2009/0283291 A1 * | 11/2009 | Ni .................... H01R 13/5213 |
| | | 174/67 |
| 2010/0181091 A1 * | 7/2010 | Drane .................... H02G 3/14 |
| | | 174/66 |
| 2014/0262418 A1 | 9/2014 | Korcz et al. |
| 2015/0288157 A1 | 10/2015 | Wijaya |
| 2018/0048132 A1 | 2/2018 | Dinh et al. |
| 2020/0244056 A1 | 7/2020 | Ustianowski |

\* cited by examiner

WEATHER-RESISTANT ELECTRICAL DEVICE ENCLOSURE

PRIORITY CLAIM

This utility patent application is a continuation-in-part of U.S. patent application Ser. No. 16/257,465, filed on Jan. 25, 2019, the contents of which are incorporated by reference in this application.

TECHNICAL FIELD AND BACKGROUND OF INVENTION

This invention relates to weather-resistant electrical device enclosures of the general type that are installed out-of-doors to protect electrical devices such as electrical switches, power outlets and the like from water, such as may be directed onto the electrical device enclosures by irrigation sprinklers, rain, etc. Such enclosures are known in the art, and are generally described as "waterproof" enclosures because they provide a means of sheltering the switches, outlets, etc. from contact with water while the electrical devices are in use. This type of enclosure is distinct from outside electrical outlets that have a spring-loaded cover that protects an outlet, for example, when not in use, but not while an electrical device such as the plug of a power cord is plugged into the outlet.

Existing single and double gang enclosures typically have an access opening on a base that is designed to accommodate an insert plate with one or more electrical device openings that match the outline shape of an electrical device, for example a flip-type light switch, standard two or three blade 110V or 220V outlet, among others. These outline shapes vary considerably to take into account the varying outline shapes of many different types of electrical devices, and some include a series of "knock-out" areas by which a single insert plate can be customized for use with several differently-shaped and/or sized electrical devices. Prior art enclosures typically have insert plates that are specific to the size of the enclosure, i.e., an insert plate for a single gang enclosure will not fit into the access opening of a double gang enclosure, and vice versa.

Conventional electrical device enclosures are typically molded of thick, heavy plastic material as a means of providing a durable, long-lasting device. The covers of such devices typically cover approximately the same area as the base, and provide protection against entry of water by seals and gaskets that compress against adjacent surfaces. The overall result of these prior art designs is an enclosure that is relatively heavy, easily damaged and thus expensive to purchase and to replace.

Another drawback of prior art enclosures is the manner in which the insert plates are mounted into the access openings. Typically, the insert plate is mounted into the access opening in the base from the front of the base, meaning that unless it is very securely mounted, it can come loose when, for example, a plug is being pulled from an outlet.

SUMMARY OF THE INVENTION

It is therefore an object of the present invention to provide a weather-resistant electrical device enclosure that is lightweight, resistant to damage, and water-resistant without the need for gaskets or seals between the enclosure base and cover.

It is another object of the invention to provide a weather-resistant electrical device enclosure that provides water-resistance by means of a cover that provides a distinct overhang beyond the side walls of the base as a means of deflecting water from entering the interior of the base.

These and other objects and advantages of the invention are achieved by providing a weather-resistant electrical device enclosure that includes a base defining an interior and a rear wall for being mounted to a supporting structure having at least one opening in the rear wall for receiving an insert plate having an electrical device opening for receiving an electrical device to extend therethrough. The base has a forwardly-facing access opening for accessing the interior of the base and a peripheral rim surrounding the access opening remote from the rear wall of the base. A cover is pivotally-mounted in relation to the base and selectively movable between a closed position proximate the peripheral front rim of the base and an open position exposing the interior of the base. The cover has a peripheral cover flange terminating at an outer edge extending around the cover, when in the closed position.

According to another aspect of the invention, at least one insert plate is provided having at least one opening of a predetermined selected shape and size for receiving an electrical device of a predetermined selected shape and size to extend therethrough.

According to another aspect of the invention, the outer edge of the peripheral cover flange extends laterally outwardly away from and in spaced-apart relation to the peripheral rim of the base, the outer edge of the peripheral cover flange is positioned exterior to the base intermediate the peripheral rim of the base and the rear wall of the base to define a protective overhang, and the cover includes an interior peripheral rim integrally-formed on an interior surface of the cover and positioned to engage the peripheral rim of the base when the cover is in a closed position on the base.

According to another aspect of the invention, the access opening is sized to receive at least two insert plates in a side-by-side relation.

According to another aspect of the invention, complementary hinges on adjacent sides of the base and cover are provided for receiving a hinge pin for permitting the enclosure to be either side opening or top opening.

According to another aspect of the invention, the base and the cover are rectilinear and adapted to be positioned on the supporting structure with either a long side or a short side of the base and cover extending laterally in a side-to-side orientation.

According to another aspect of the invention, the height of the cover and the height of the base are each one-half the height of the weather-resistant electrical device enclosure.

According to another aspect of the invention, the peripheral cover flange and a notional line perpendicular to the outer edge of the peripheral cover flange extending around the cover define an angle selected from the group of angles consisting of 22, 45 and 50 degrees.

According to another aspect of the invention, the cover defines a curve extending from an apex of the cover to the peripheral cover flange, and a notional line tangent to the curve and a notional line parallel to the outer edge of the peripheral cover flange extending around the cover define an angle selected from the group of angles consisting of 11, 13, 17, and 30 degrees.

According to another aspect of the invention, the enclosure is rectangular with two opposite long sides and two opposite short sides, and the peripheral cover flange and a notional line perpendicular to the outer edge of the peripheral cover flange extending along the long side of the enclosure defines an angle of 50 degrees, the cover defining a curve extending from an apex of the cover to the peripheral cover flange, and a notional line tangent to the curve and a notional line parallel to the outer edge of the peripheral cover flange extending around the cover define an angle of 30 degrees.

According to another aspect of the invention, the enclosure has four sides of equal length, the peripheral cover flange and a notional line perpendicular to the outer edge of the peripheral cover flange extending along a first pair of opposite sides of the cover defines an angle of 22 degrees, the cover defines a curve extending from an apex of the cover to the peripheral cover flange, and a notional line tangent to the curve and a notional line parallel to the outer edge of the peripheral cover flange extending around the cover define an angle of 11 degrees.

According to another aspect of the invention, the peripheral cover flange and a notional line perpendicular to the outer edge of the peripheral cover flange extend along a second pair of opposite sides and define an angle of 45 degrees, the cover defines a curve extending from an apex of the cover to the peripheral cover flange, and a notional line tangent to the curve and a notional line parallel to the outer edge of the peripheral cover flange extends around the cover and defines an angle of 17 degrees.

According to another aspect of the invention, the enclosure is rectangular with two opposite long sides and two opposite short sides, the short sides defining a top and bottom of the enclosure, and further wherein the cover defines a top and bottom overhang relative to the base of between 10 and 20 percent of the length of the long sides of the cover.

According to another aspect of the invention, the cover and the base are fabricated of polycarbonate R/C material type PC-122U(f2).

According to another aspect of the invention, the base includes an integrally-formed base hinge member and the cover includes a complementary, integrally-formed cover hinge member adapted to receive a hinge pin joining the respective base and cover hinge members.

According to another aspect of the invention, the base includes first and second integrally-formed base hinge members formed on adjacent sides of the base and the cover includes a complementary, integrally-formed cover hinge members formed on adjacent sides of the cover adapted to receive a hinge pin joining the respective base and cover hinge members.

According to another aspect of the invention, the cover has a thickness of 0.11 inch.

According to another aspect of the invention, the base has a thickness of 0.12 inch.

According to another aspect of the invention, the cover has a thickness of 0.11 inch and the base has a thickness of 0.12 inch.

BRIEF DESCRIPTION OF THE DRAWINGS

The invention is best understood when the following detailed description of the invention is read with reference to the accompanying drawings, in which.

DETAILED DESCRIPTION OF THE PREFERRED EMBODIMENT

Figures 1, 2:
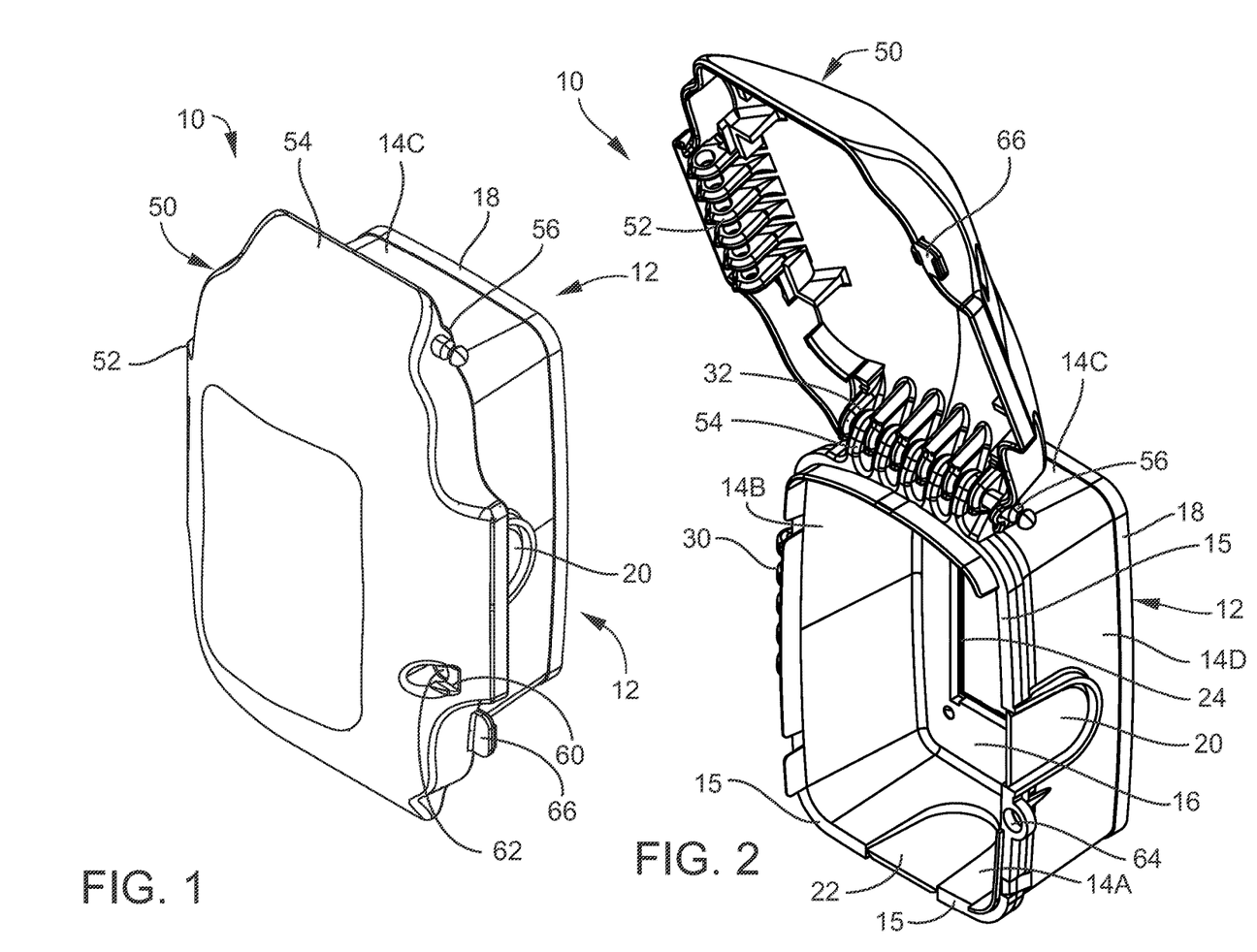
FIG. 1 is a perspective front view of a single gang electrical enclosure in a closed position.
FIG. 2 is a perspective front view of the single gang electrical enclosure of FIG. 1 in an open position.
Figure 3:
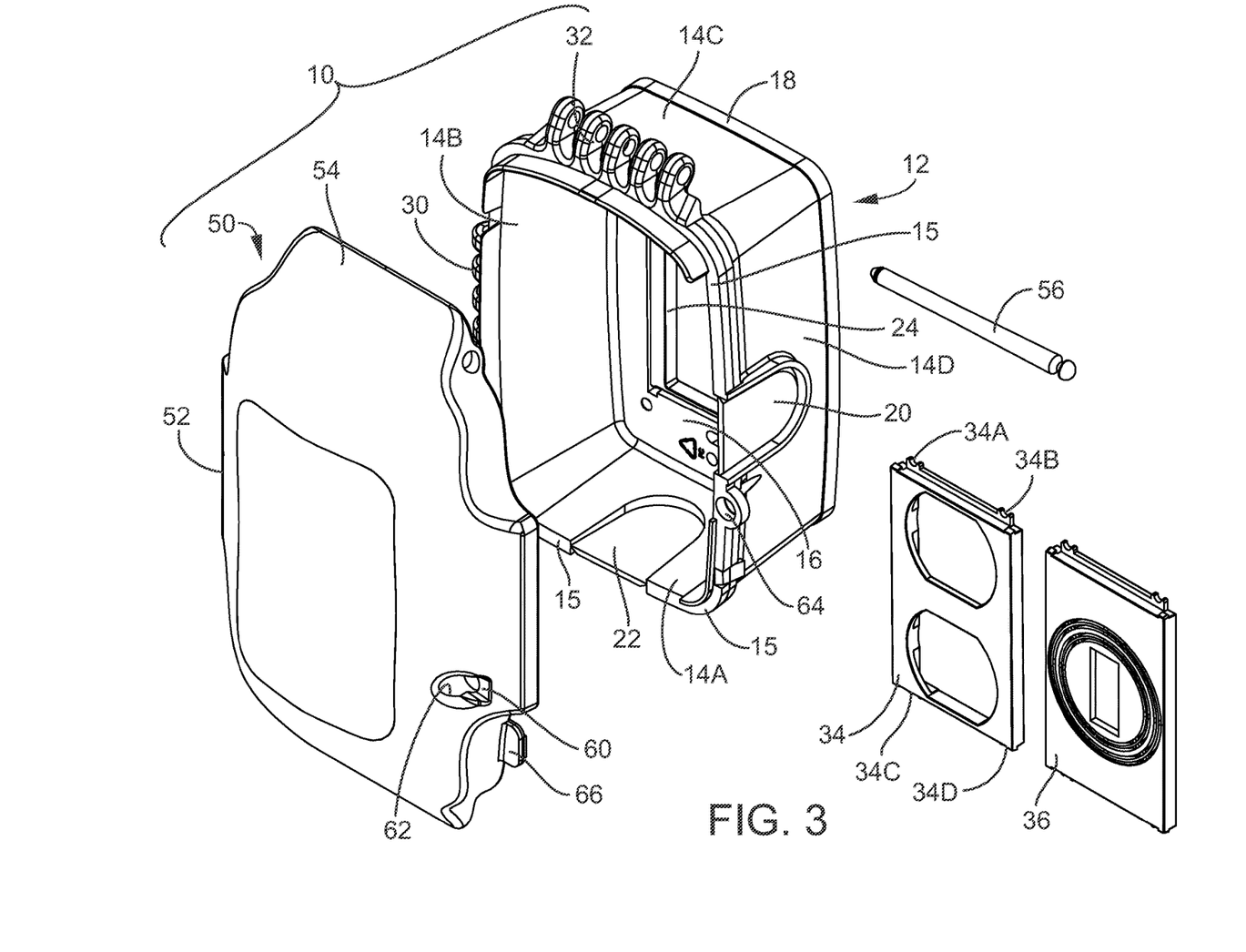
FIG. 3 is an exploded front perspective view of the single gang electrical enclosure of FIG. 1.

Referring now to FIGS. 1, 2 and 3, a single gang electrical device enclosure 10 according to one preferred embodiment of the invention is shown, and includes a base 12 preferably molded of polycarbonate, including base side walls 14A-D, and a rear base wall 16 backed by a gasket 18. As best shown in FIG. 2, the base side walls 14A-D define a discontinuous rim 15 extending around the periphery of the base 12. The side wall 14D includes a knockout panel 20 that is typically used when the side wall 14D is in an orientation to serve as the "bottom" of the enclosure 10, and a knockout panel 22 that will typically be used when the bottom wall 14A, as shown, is the bottom of the enclosure 10 as installed.

Figure 4:
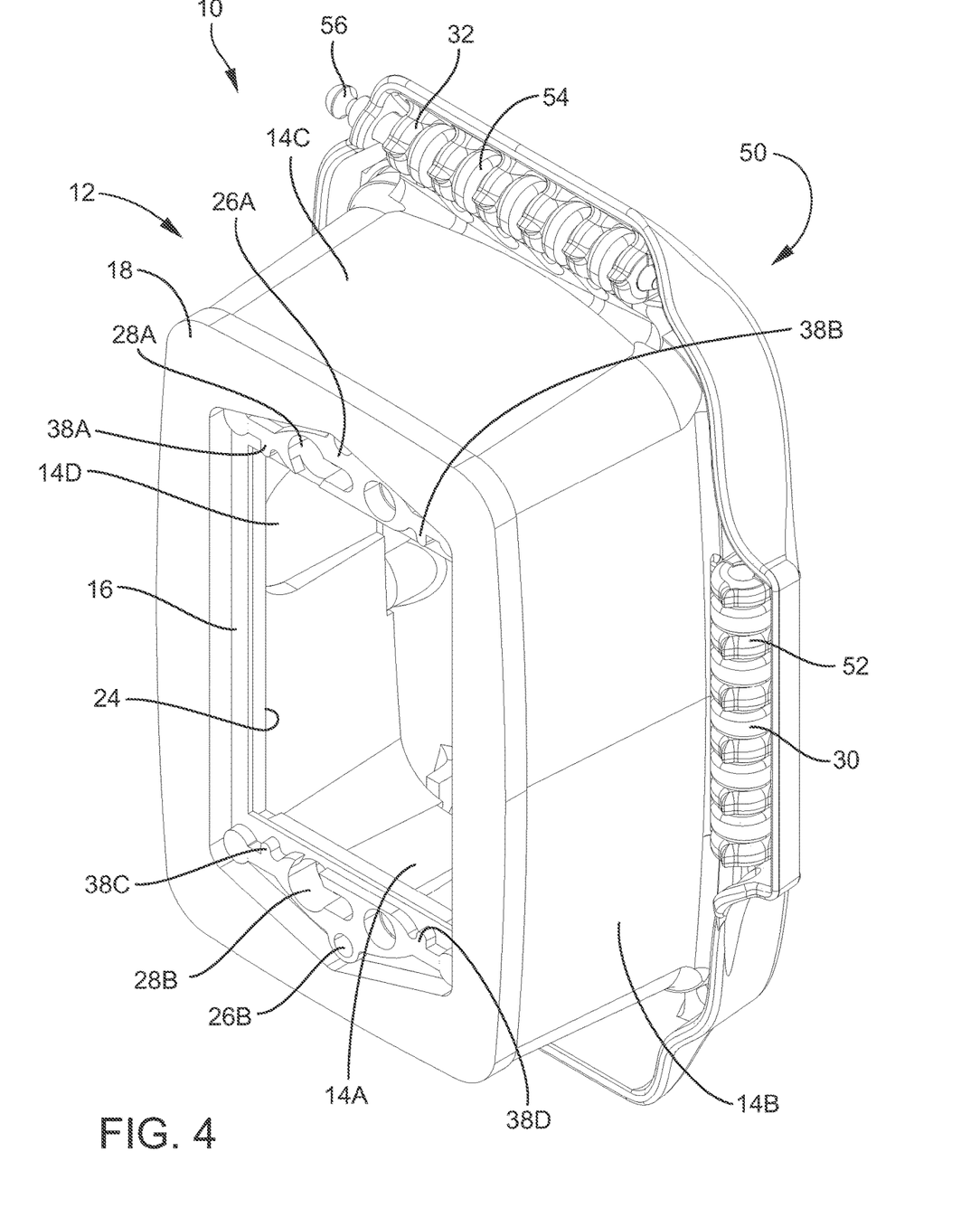
FIG. 4 is a rear perspective view of the single gang electrical enclosure of FIG. 1.

As best shown in FIG. 4, the rear wall 16 includes a centrally-positioned access opening 24, mounting screw holes 26A-B and mounting screw keyholes 28A-B. Side wall 14B includes a base hinge element 30 and side wall 14C includes a base hinge element 32. Bosses 38A-D in the form of semispherical raised elements extend outwardly from the back surface of the rear wall 16 the same distance as the screw keyholes 28A-B. Insert plates 34 and 36 are exemplary of insert plates having access openings of various sizes and shapes that are adapted to fit into the single access opening 24.

By way of example, insert plate 34 of FIG. 3 includes outwardly projecting tabs 34A-D with semicircular openings that fit around the bosses 38A-D, respectively, to lock the insert plate 34 into place in the access opening 24. The thickness of the insert plate 34 is such that it is flush with the level of the gasket 18 on the back side of the rear wall 16. The insert plate 34 is therefore held against movement when the base 12 is installed on a support structure. Because the insert plate 34 is mounted on the back side of the rear wall 16, it is held in its installed position by the support structure to which the base 12 is mounted. While not discussed specifically, the other insert plates have identical tabs that include semicircular openings that fit around the bosses 38A-D, respectively.

Still referring to FIGS. 1-3, cover 50 is preferably fabricated of a transparent or semitransparent polycarbonate and includes cover hinge elements 52 and 54, each spaced-apart to receive respective base hinge elements 30 and 32. The cover 50 is deep enough to fully close against the base 12. If the enclosure 10 is intended to be mounted with the knockout panel 22 at the bottom with the cover 50 opening from the top as shown in FIG. 2, hinge elements 54 and 32 are interconnected and a hinge pin 56 is inserted in aligned openings in the hinge elements 54 and 32. The same arrangement can be used with the enclosure 10 mounted laterally with the knockout panel 20 at the bottom, in which case the cover 50 will open to one side.

If the enclosure 10 is intended to be mounted with the knockout panel 20 at the bottom with the cover 50 opening from the top, hinge elements 52 and 30 are interconnected and the hinge pin 56 is inserted in aligned openings. The same arrangement can be used with the enclosure 10 mounted with the knockout panel 22 at the side, in which case the cover 50 will open from one side.

The cover 50 includes a cover lock 60 formed on a corner of the cover 50. A hole 62 in the cover lock 60 aligns with hole 64 in the base 12 when the cover 50 is closed, and the cover 50 can be locked with a small padlock, zip-tie or some other means. A cover lift tab 66 formed on the corner of the cover 50 provides a means of easily opening the cover 50 away from the base 12.

Figure 5:
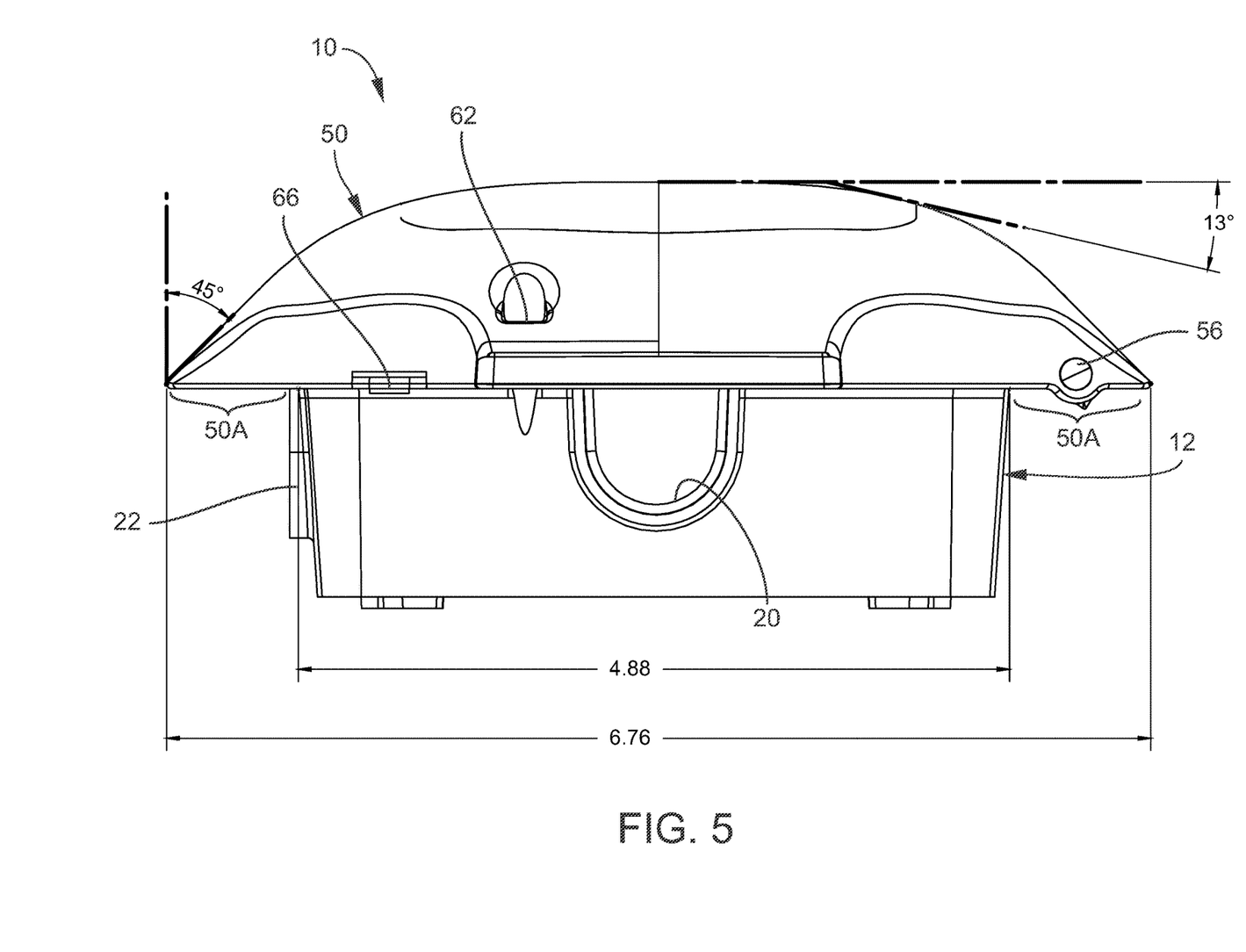
FIG. 5 is a side elevation of the single gang electrical enclosure of FIG. 1.
Figure 6:
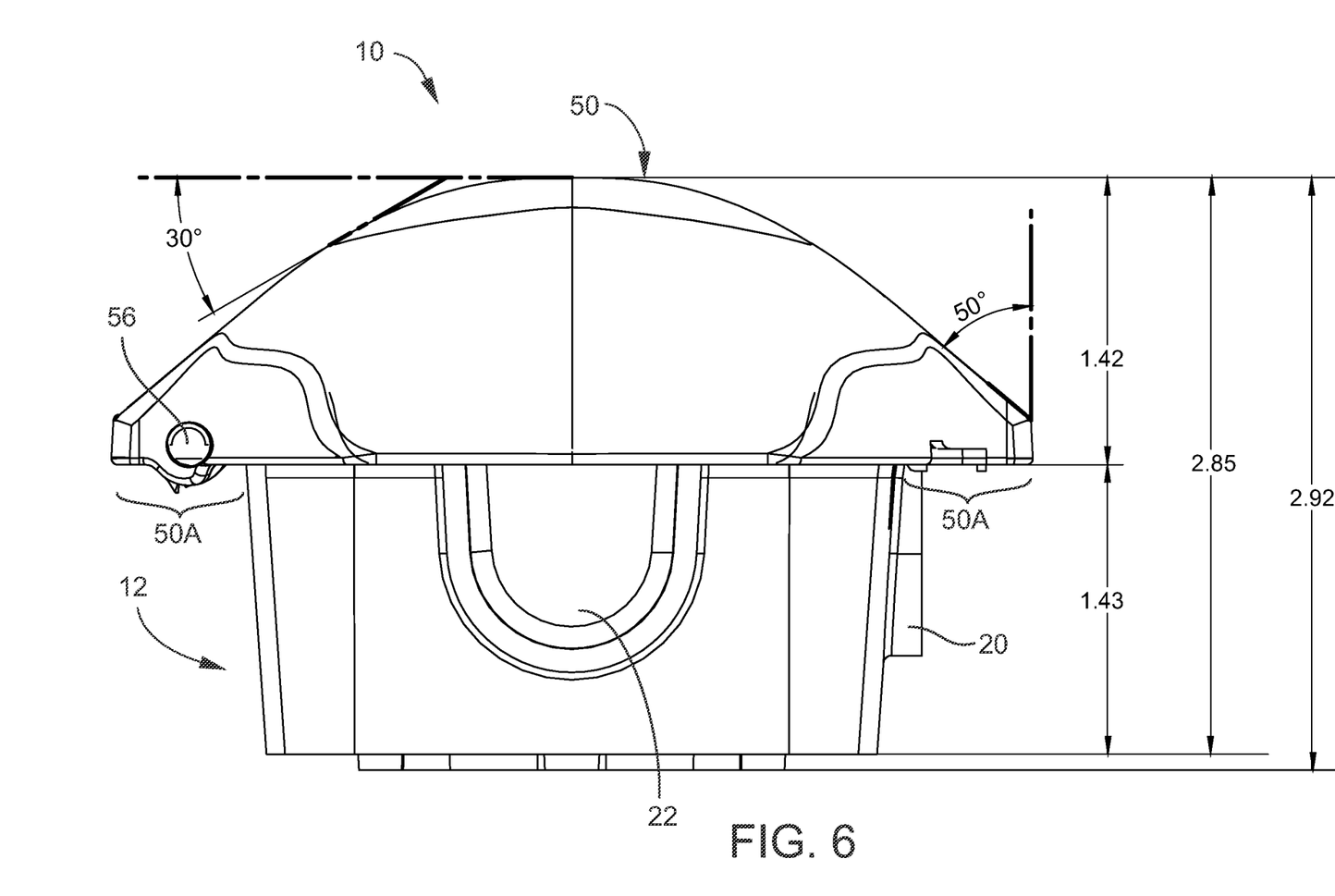
FIG. 6 is an end elevation of the single gang electrical enclosure of FIG. 1.

Referring now to FIGS. 5 and 6, the enclosure 10 is shown in widthwise side and lengthwise end elevation to further illustrate two significant features—the curved dome configuration of the cover 50 and the high degree of "overhang" of the cover 50 relative to the base 12. These features are in distinct contrast to prior art enclosures where the base and the cover occupy essentially the same footprint, and water intrusion is retarded by a tight fit and gasketing between the cover and the base. FIGS. 5 and 6 include angles and dimensions as a way of making this distinction. As shown in FIG. 5, the cover 50 includes a curving peripheral cover flange 50A. A notional line perpendicular to the outer edge of the peripheral cover flange 50A extending along the long sides of the cover 50 defines a 45 degree angle, as shown. Still referring to FIG. 5, according to a preferred embodiment, the cover 50 defines a curve extending from an apex of the cover to the peripheral cover flange 50A. A notional line tangent to the curve and a notional line parallel to the outer edge of the peripheral cover flange 50A defines a 13 degree angle, as shown.

Also as shown in FIG. 5, the cover 50 has a length from end to end of 6.76 inches, and the base has a length from end to end of 4.88 inches. This difference defines an overhang of approximately 1 inch extending around the periphery of the enclosure 10, defined by the peripheral cover flange 50A, as shown. The overhang is both "outward" and "downward." In this particular embodiment, the overhang on each end of the cover 50 is approximately 15 percent (1"÷6.76"=14.8%) but may be as little as 10 percent or as great as 20 percent. Water therefore sheds from the cover 50 well away from the base 12 and is directed away from the enclosure 10.

Referring to FIG. 6, the cover 50 along its lengthwise dimension likewise includes the peripheral cover flange 50A with a similar extent of overhang. A notional line perpendicular to the outer edge of the peripheral cover flange 50A defines a 50 degree angle, as shown. Still referring to FIG. 6, according to a preferred embodiment, the cover 50 defines a curve extending from an apex of the cover 50 to the peripheral cover flange 50A. A notional line tangent to the curve and a notional line parallel to the outer edge of the peripheral cover flange 50A defines a 30 degree angle, as shown.

As also shown in FIG. 6, the extent of the curves in the cover 50 reveals that the cover 50 represents a much larger percentage of the total height of the enclosure 10 that is in prior art enclosures. As evident from the height dimensions shown in FIG. 6, the cover 50 is very nearly the same height as the base 12. Compare the cover 50 height of 1.42 inches vs. the base 12 height 1.43 or 1.50 inches. For purposes of this application, the height dimensions of the base 12 and the cover 50 are effectively the same.

These angles and percentages are not limiting, but rather define a relationship wherein the combination of a curve and a degree of overhang provide an adequate degree of protection against water intrusion into the interior of the enclosure 10.

Figures 7, 8:
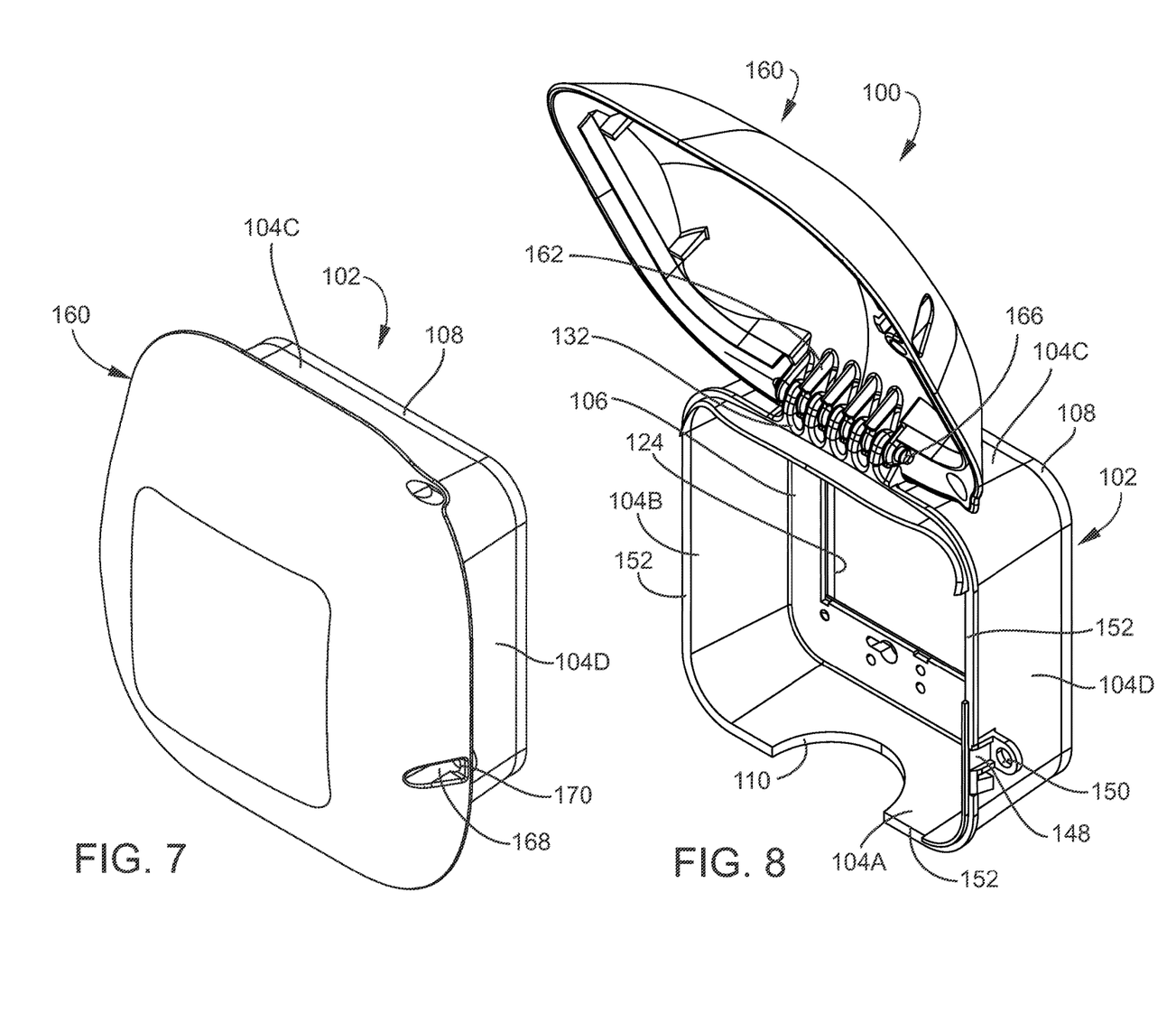
FIG. 7 is a front perspective view of a double gang electrical enclosure in a closed position.
FIG. 8 is a front perspective view of a double gang electrical enclosure of FIG. 7 in an open position.
Figure 9:
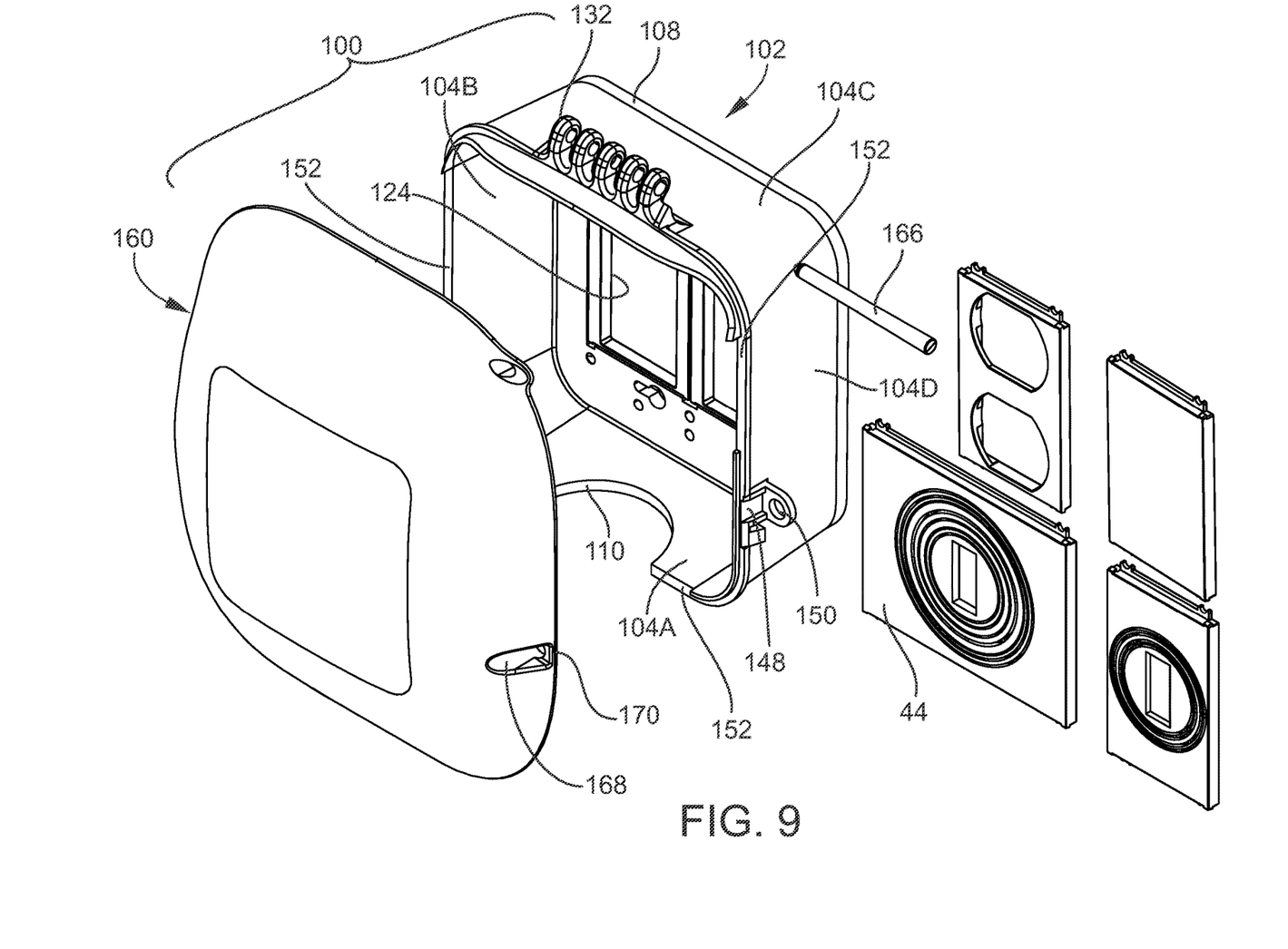
FIG. 9 is an exploded front perspective view of the double gang electrical enclosure of FIG. 7.
Figure 10:
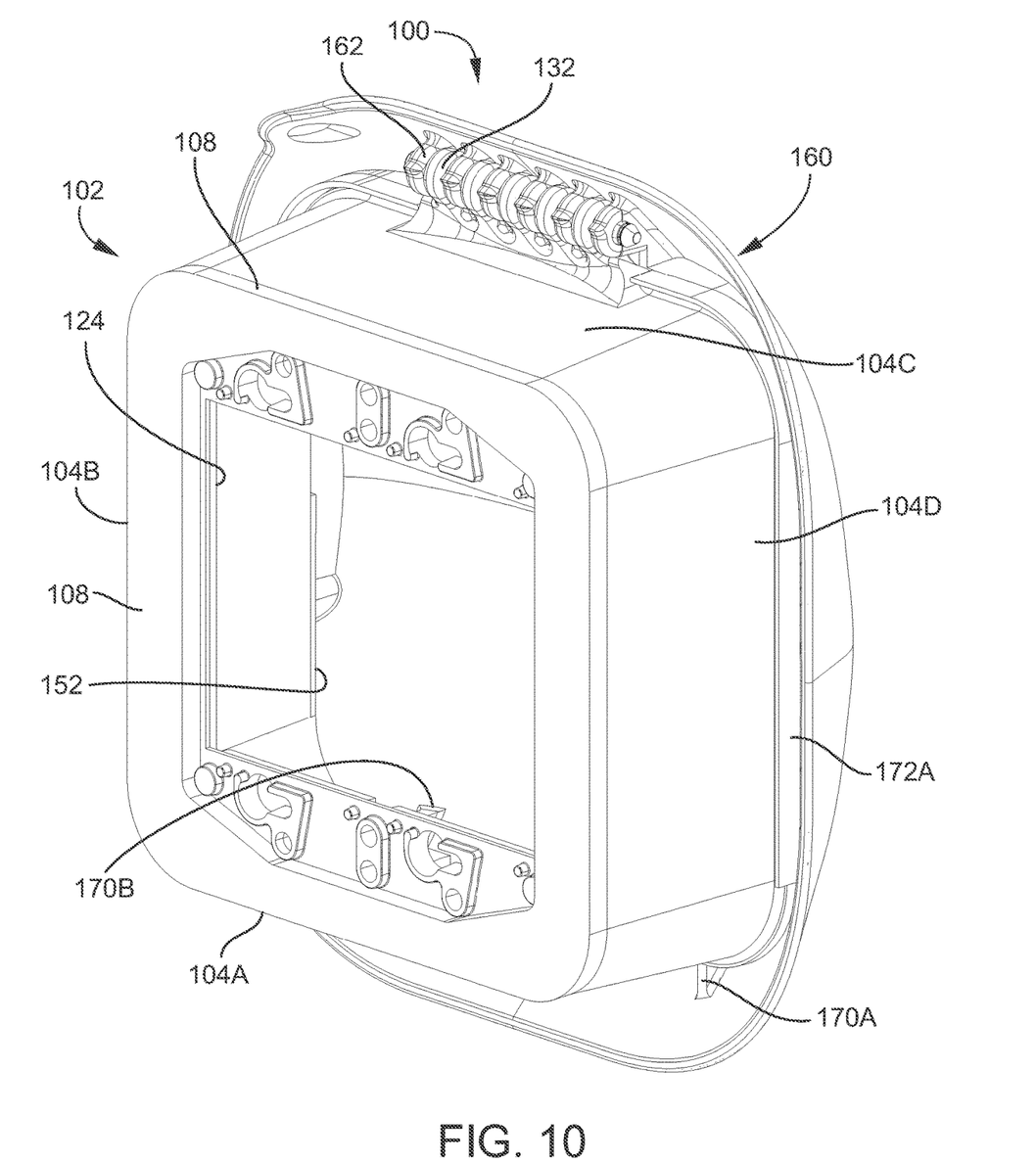
FIG. 10 is a rear perspective view of the double gang electrical enclosure of FIG. 7.
Figure 11:
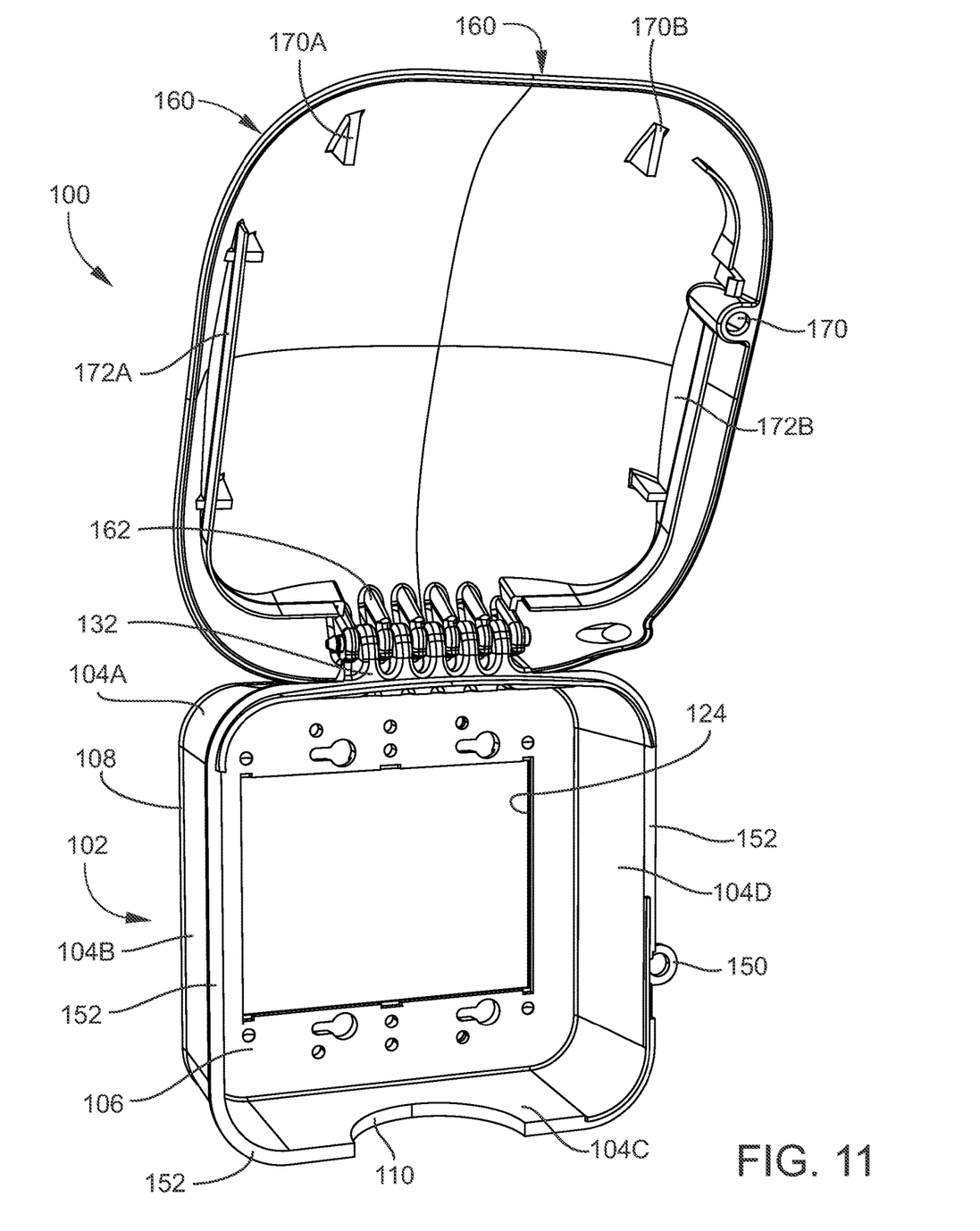
FIG. 11 is a front perspective view of the double gang electrical enclosure of FIG. 7, and particularly the peripheral front rim of the base and the cooperating interior peripheral rim of the cover.

Referring now to FIGS. 7-13, a double gang electrical device enclosure 100 according to one preferred embodiment of the invention is shown, and includes a base 102 preferably molded from polycarbonate and including side walls 104A-D, a rear wall 106 and a rear gasket 108. The enclosure 100 has equilateral sides, i.e., it is in plan view essentially square. An access opening 110 for allowing passage of a power cord into the interior of the enclosure 100 is formed in the base wall 104A, as best shown in FIGS. 8 and 9. As shown in FIGS. 8 and 11, the base side walls 104A-D define a discontinuous rim 152 extending around the periphery of the base 102.

The rear wall 106 includes a centrally-positioned access opening 124 sized to receive either two single gang insert plates or a single double insert plate. Side wall 104C includes a base hinge element 132. Insert plates 34 and 36 described above with reference to FIGS. 1 and 2 are also useable with the enclosure 100. As best shown in FIG. 9, an insert plate 44 is provided and is sized to fit into and cover the entire extent of the access opening 124. See also FIG. 10, which shows ancillary features on the back side of the enclosure 100.

The base 102 also includes a lock 148 with a hole 150 is positioned on a corner of the base 102 remote from the base hinge element 132.

Still referring to FIGS. 7-10, a cover 160 is preferably fabricated of a transparent or semitransparent polycarbonate and includes a cover hinge element 162 spaced-apart to receive base hinge element 132. The cover 160 is deep enough to fully close against the base 102. Cover hinge element 162 interconnects with the base hinge element 132, and the hinge pin 166 is inserted in aligned openings, not shown, in the cover hinge elements 162 and 132, allowing pivoting movement of the cover 160 in relation to the base 102.

The cover 160 includes a cover locking recess 168 formed on a corner of the cover 160. A hole 170 in the cover locking recess 168 aligns with the hole 150 in the base lock 148 when the cover 160 is closed and the cover 160 can be locked with a small padlock, zip-tie or some other means. The cover 160 is easily opened to expose the interior of the base 102 by lifting either of the corners of the cover 160 on the end of the cover 160 opposite the hinge element 162.

Referring now to FIG. 11, the inner surface of the cover 160 includes a pair of standoffs 170A-B positioned near the edge of the cover 160 remote from the hinge element 162. The inner surface of the cover 160 also includes a pair of interior peripheral rims 172A-B integrally molded into the cover 160 and spaced-apart from the edges of the cover 160 a sufficient distance to permit the peripheral rim 152 of the base 102 to fit snuggly between the edges of the cover 160 and the pair of interior peripheral rims 172A-B. This position provides anti-racking support to the cover 160 and provides a further barrier to water entry into the base 102.

Figure 12:
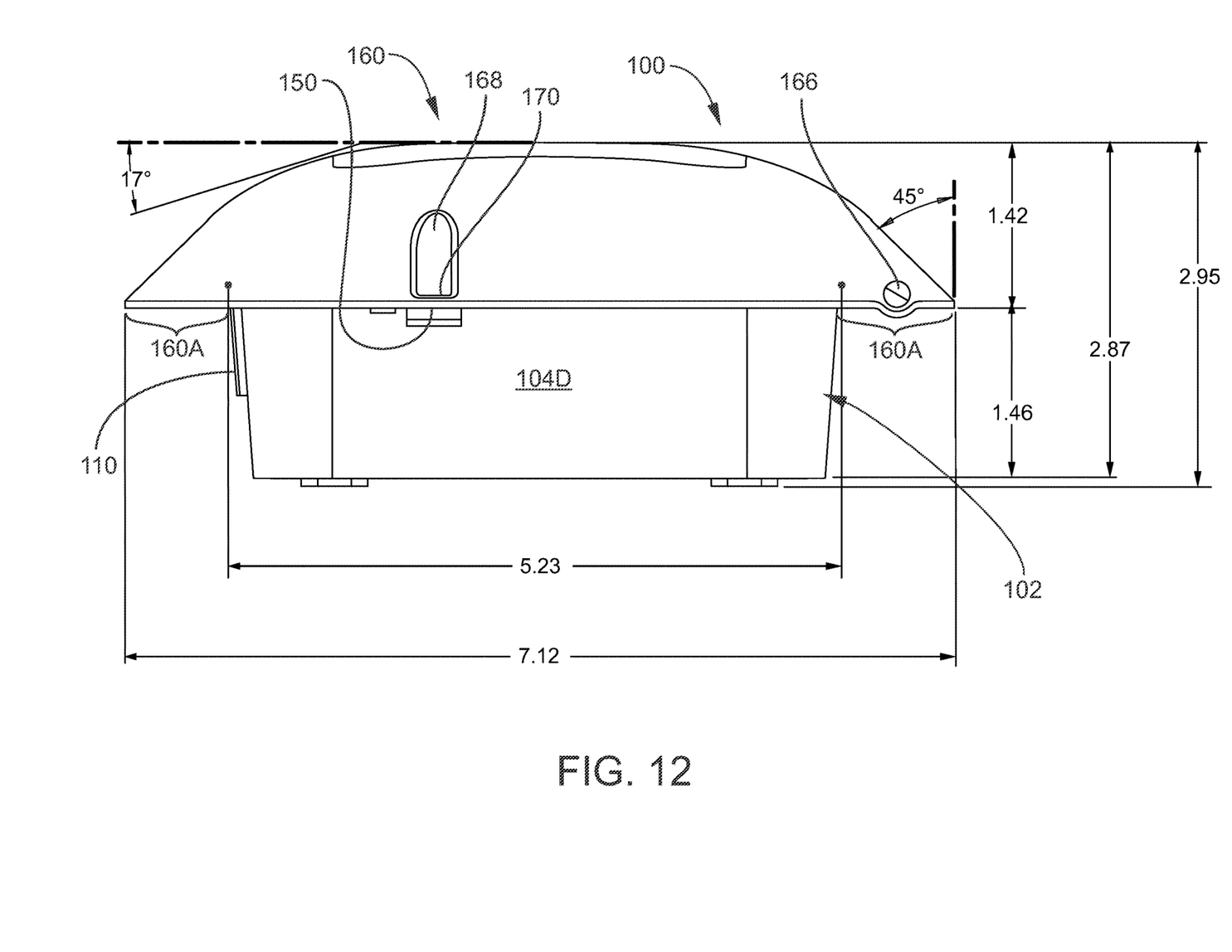
FIG. 12 is a side elevation of the double gang electrical enclosure of FIG. 7.
Figure 13:
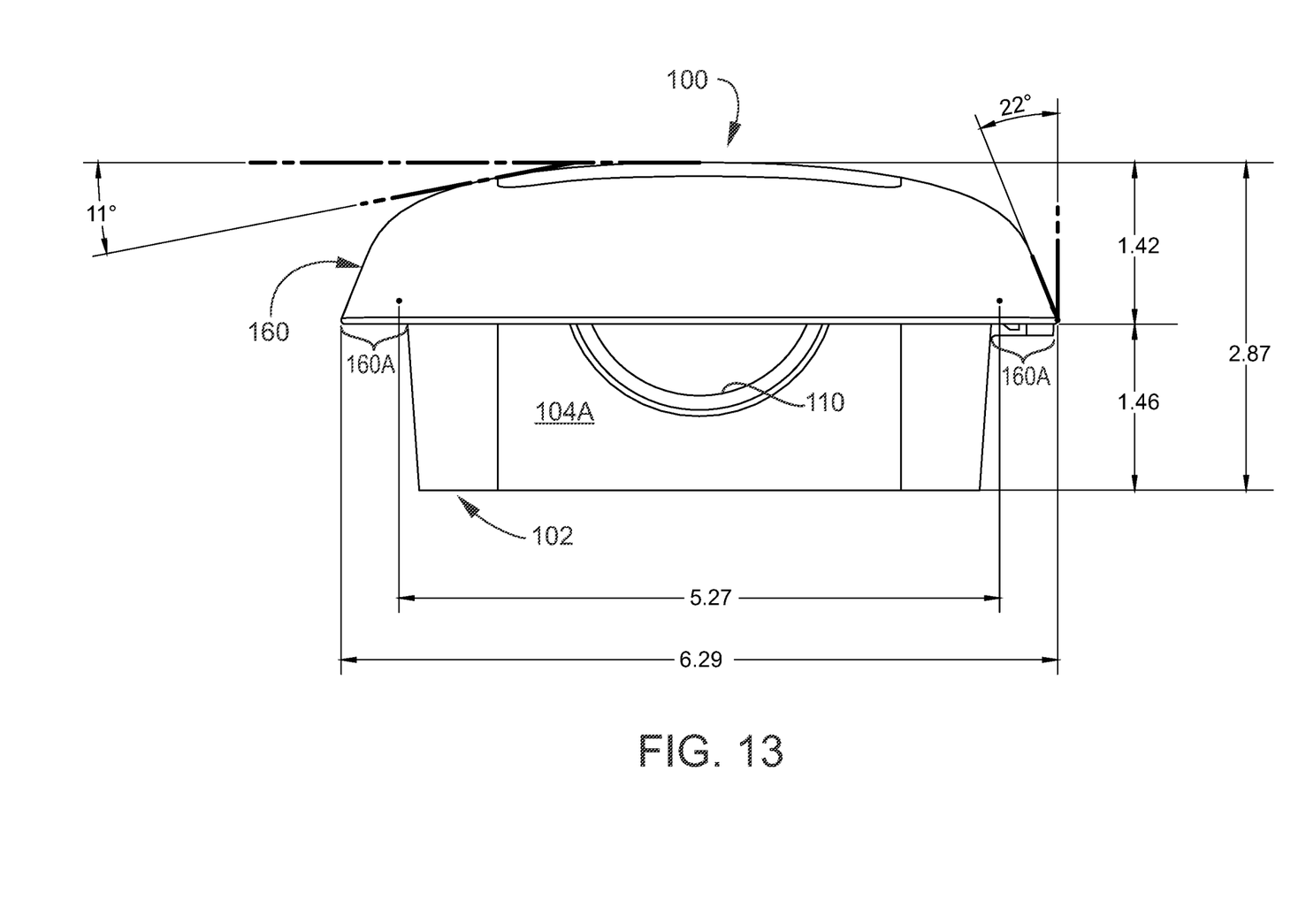
FIG. 13 is an end elevation of the double gang electrical enclosure of FIG. 7.

Referring to FIGS. 12 and 13, the cover 160 includes a downwardly curving peripheral cover flange 160A that extends around the periphery of the cover 160 and defines its outer edge.

As shown in FIG. 12, the cover 160 from the hinge end identified by the hinge pin 166 to the opposite end of the cover 160 defines a notional line perpendicular to the outer edge of the curved peripheral cover flange 160A having a 45 degree angle, as shown. Still referring to FIG. 12, according to a preferred embodiment, the cover 160 defines a curve extending from an apex of the cover 160 to the peripheral cover flange 160A. A notional line tangent to the curve and a notional line parallel to the outer edge of the peripheral cover flange 160A defines a 17 degree angle, as shown.

Also as shown in FIG. 12, the cover 160 has a length from end to end of 7.12 inches, and the base has a length from end to end of 5.23 inches. This difference defines an overhang of approximately 1 inch extending around the periphery of the enclosure 100, defined by the peripheral cover flange 160A, as shown. In this particular embodiment, the overhang is approximately 15 percent (1"÷7.12"=14.0%) but may be as little as 10 percent or as great as 20 percent.

Referring to FIG. 13, cover 160 likewise includes the peripheral cover flange 160A with essentially the same extent of overhang. A notional line perpendicular to the outer edge of the peripheral cover flange 160A defines a 22 degree angle, as shown. Still referring to FIG. 13, according to a preferred embodiment, the cover 160 defines a curve extending from its apex to the peripheral cover flange 160A. A notional line tangent to the curve of the cover 160 and a notional line parallel to the outer edge of the peripheral cover flange 160A defines a 11 degree angle, as shown.

As also shown in FIG. 13, the extent of the curves in the cover 160 reveals that the cover 160 represents a much larger percentage of the total height of the enclosure 100 than in prior art enclosures. As evident from the height dimensions shown in FIG. 13, the cover 160 is very nearly the same height as the base 102. Compare the cover 160 height of 1.42 inches vs. the base 102 height of 1.46 inches. For purposes of this application, the height dimensions of the base 102 and the cover 160 are the same.

These angles and percentages are not limiting, but rather define a relationship wherein the combination of a curve and a degree of overhang provide an adequate degree of protection against water intrusion into the interior of the enclosure 102.

In this particular embodiment, the overhang is approximately 15 percent (1"÷6.29"=15.8%) but may be as little as 10 percent or as great as 20 percent.

A further significant feature of the enclosures 10 and 100 is the materials and material thickness of the bases and covers. Both structures are molded of polycarbonate R/C material type PC-122U(f2). This is a particularly strong yet lightweight and flexible material. It is highly resistant to breakage and temperature extremes. In accordance with one embodiment of the enclosures 10 and 100, the cover has a thickness of 0.11 inch and the base has a thickness of 0.12 inch. For these reasons, the enclosures 10 and 100 are very lightweight, in the range of 10-15 percent lighter, in comparison with prior art enclosures by Intermatic and Taymac:

Intermatic Single gang=0.446 lbs.
Taymac Single gang=0.425 lbs.
Claimed NSi Single gang=0.383 lbs.
Similar values pertain to the double gang enclosures.

While other materials and thicknesses are within the scope of the invention, UL testing has demonstrated that these materials and thicknesses yield a lightweight enclosure nevertheless having superior strength and durability.

An electrical device enclosure according to the invention has been described with reference to specific embodiments and examples. Various details of the invention maybe changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. A weather-resistant electrical device enclosure comprising:
   (a) a base defining an interior and a rear wall for being mounted to a supporting structure;
   (b) at least one opening in the rear wall for receiving an insert plate having an electrical device opening for receiving an electrical device;
   (c) the base having a forwardly facing access opening for accessing the interior of the base and a peripheral front rim surrounding the forwardly-facing access opening remote from the rear wall of the base;
   (d) a cover pivotally-mounted in relation to the base and selectively movable between a closed position proximate the peripheral front rim of the base and an open position exposing the interior of the base; and
   (e) the cover having a peripheral cover flange terminating at an outer edge extending around the cover and outwardly from the peripheral front rim of the base when in the closed position;
   wherein the peripheral cover flange and a notional line perpendicular to the outer edge of the peripheral cover flange extending around the cover define an angle selected from the group of angles consisting of 22, 45 and 50 degrees.

2. A weather-resistant electrical device enclosure according to claim 1, wherein the rear wall further comprises a backwardly-facing access opening sized to fit at least one insert plate having at least one opening of a predetermined selected shape and size for receiving an electrical device of a predetermined selected shape and size to extend therethrough.

3. A weather-resistant electrical device enclosure according to claim 1, wherein the outer edge of the peripheral cover flange extends laterally outwardly away from and in spaced-apart relation to the peripheral front rim of the base, the outer edge of the peripheral cover flange is positioned exterior to the base intermediate the peripheral front rim of the base and the rear wall of the base to define a protective overhang, and the cover includes an interior peripheral rim integrally-formed on an interior surface of the cover and positioned to engage the peripheral front rim of the base when the cover is in a closed position on the base.

4. A weather-resistant electrical device enclosure according to claim 2, wherein the backwardly-facing access opening is sized to receive at least two insert plates in a side-by-side relation.

5. A weather-resistant electrical device enclosure according to claim 1, and including complementary hinges on adjacent sides of the base and cover for receiving a hinge pin for permitting the enclosure to be either side opened or top opened.

6. A weather-resistant electrical device enclosure according to claim 1, wherein the base and the cover are rectilinear and adapted to be positioned on the supporting structure with either a long side or a short side of the base and cover extending laterally in a side-to-side orientation.

7. A weather-resistant electrical device enclosure according to claim 1, wherein the height of the cover and the height of the base are each one-half the height of the weather-resistant electrical device enclosure.

8. A weather-resistant electrical device enclosure, comprising
   (a) a base defining an interior and a rear wall for being mounted to a supporting structure;
   (b) at least one opening in the rear wall for receiving an insert plate having an electrical device opening for receiving an electrical device;
   (c) the base having a forwardly-facing access opening for accessing the interior of the base and a peripheral front rim surrounding the forwardly-facing access opening remote from the rear wall of the base;
   (d) a cover pivotally-mounted in relation to the base and selectively movable between a closed position proximate the peripheral front rim of the base and an open position exposing the interior of the base; and
   (e) the cover having a peripheral cover flange terminating at an outer edge extending around the cover and outwardly from the peripheral front rim of the base when in the closed position;
wherein the cover defines a curve extending from an apex of the cover to the peripheral cover flange, and further wherein a notional line tangent to the curve and a notional line parallel to the outer edge of the peripheral cover flange extending around the cover define an angle selected from the group of angles consisting of 11, 13, 17, and 30 degrees.

9. A weather-resistant electrical device enclosure, comprising:
   (a) a base defining an interior and a rear wall for being mounted to a supporting structure;
   (b) at least one opening in the rear wall for receiving an insert plate having an electrical device opening for receiving an electrical device;
   (c) the base having a forwardly-facing access opening for accessing the interior of the base and a peripheral front rim surrounding the forwardly-facing access opening remote from the rear wall of the base;
   (d) a cover pivotally-mounted in relation to the base and selectively movable between a closed position proximate the peripheral front rim of the base and an open position exposing the interior of the base; and
   (e) the cover having a peripheral cover flange terminating at an outer edge extending around the cover and outwardly from the peripheral front rim of the base when in the closed position;
wherein the enclosure is rectangular with two opposite long sides and two opposite short sides, and the peripheral cover flange and a notional line perpendicular to the outer edge of the peripheral cover flange extending along the long side of the enclosure define an angle of 50 degrees, the cover defines a curve extending from an apex of the cover to the peripheral cover flange, and a notional line tangent to the curve and a notional line parallel to the outer edge of the peripheral cover flange extending around the cover define an angle of 30 degrees.

10. A weather-resistant electrical device enclosure, comprising:
    (a) a base defining an interior and a rear wall for being mounted to a supporting structure;
    (b) at least one opening in the rear wall for receiving an insert plate having an electrical device opening for receiving an electrical device;
    (c) the base having a forwardly-facing access opening for accessing the interior of the base and a peripheral front rim surrounding the forwardly-facing access opening remote from the rear wall of the base;
    (d) a cover pivotally-mounted in relation to the base and selectively movable between a closed position proximate the peripheral front rim of the base and an open position exposing the interior of the base; and
    (e) the cover having a peripheral cover flange terminating at an outer edge extending around the cover and outwardly from the peripheral front rim of the base when in the closed position;
wherein the enclosure has four sides of equal length, the peripheral cover flange and a notional line perpendicular to the outer edge of the peripheral cover flange extending along a first pair of opposite sides of the cover defines an angle of 22 degrees, the cover defines a curve extending from an apex of the cover to the peripheral cover flange, and a notional line tangent to the curve and a notional line parallel to the outer edge of the peripheral cover flange extending around the cover define an angle of 11 degrees.

11. A weather-resistant electrical device enclosure according to claim 10, wherein the peripheral cover flange and a notional line perpendicular to the outer edge of the peripheral cover flange extending along a second pair of opposite sides define an angle of 45 degrees, the cover defines a curve extending from an apex of the cover to the peripheral cover flange, and a notional line tangent to the curve and a notional line parallel to the outer edge of the peripheral cover flange extending around the cover define an angle of 17 degrees.

12. A weather-resistant electrical device enclosure according to claim 1, wherein the enclosure is rectangular with two opposite long sides and two opposite short sides defining an overhang relative to the base of between 10 and 20 percent of the length of the long sides of the cover.

13. A weather-resistant electrical device enclosure according to claim 1, wherein the enclosure is square in plan, wherein the sides of the cover define an overhang relative to the base of between 10 and 20 percent of the length of the sides of the cover.

14. A weather-resistant electrical device enclosure according to claim 1, wherein the cover and the base are fabricated of polycarbonate R/C material type PC-122U(f2).

15. A weather-resistant electrical device enclosure according to claim 1, wherein the base includes an integrally-formed base hinge member and the cover includes a complementary, integrally-formed cover hinge member adapted to receive a hinge pin joining the respective base and cover hinge members for pivotal movement of the base and cover between open and closed positions.

16. A weather-resistant electrical device enclosure according to claim 1, wherein the base includes first and second integrally-formed base hinge members formed on adjacent sides of the base and the cover includes a complementary, integrally-formed cover hinge members formed on adjacent sides of the cover adapted to receive a hinge pin joining the respective base and cover hinge members for pivotal movement of the base and cover between open and closed positions.

17. A weather-resistant electrical device enclosure according to claim 1, wherein the cover has a thickness of 0.11 inch.

18. A weather-resistant electrical device enclosure according to claim 1, wherein the base has a thickness of 0.12 inch.

19. A weather-resistant electrical device enclosure according to claim 1, wherein the cover has a thickness of 0.11 inch and the base has a thickness of 0.12 inch.

20. A weather-resistant electrical device enclosure according to claim 8, wherein the rear wall further comprises a backwardly-facing access opening sized to fit at least one insert plate having at least one opening of a predetermined selected shape and size for receiving an electrical device of a predetermined selected shape and size to extend therethrough.

21. A weather-resistant electrical device enclosure according to claim 8, wherein the outer edge of the peripheral cover flange extends laterally outwardly away from and in spaced-apart relation to the peripheral front rim of the base, the outer edge of the peripheral cover flange is positioned exterior to the base intermediate the peripheral front rim of the base and the rear wall of the base to define a protective overhang, and the cover includes an interior peripheral rim integrally-formed on an interior surface of the cover and positioned to engage the peripheral front rim of the base when the cover is in a closed position on the base.

22. A weather-resistant electrical device enclosure according to claim 20, wherein the backwardly-facing access opening is sized to receive at least two insert plates in a side-by-side relation.

23. A weather-resistant electrical device enclosure according to claim 8, and including complementary hinges on adjacent sides of the base and cover for receiving a hinge pin for permitting the enclosure to be either side opened or top opened.

24. A weather-resistant electrical device enclosure according to claim 8, wherein the base and the cover are rectilinear and adapted to be positioned on the supporting structure with either a long side or a short side of the base and cover extending laterally in a side-to-side orientation.

25. A weather-resistant electrical device enclosure according to claim 8, wherein the height of the cover and the height of the base are each one-half the height of the weather-resistant electrical device enclosure.

26. A weather-resistant electrical device enclosure according to claim 8, wherein the enclosure is rectangular with two opposite long sides and two opposite short sides defining an overhang relative to the base of between 10 and 20 percent of the length of the long sides of the cover.

27. A weather-resistant electrical device enclosure according to claim 8, wherein the enclosure is square in plan, wherein the sides of the cover define an overhang relative to the base of between 10 and 20 percent of the length of the sides of the cover.

28. A weather-resistant electrical device enclosure according to claim 8, wherein the cover and the base are fabricated of polycarbonate R/C material type PC-122U(f2).

29. A weather-resistant electrical device enclosure according to claim 8, wherein the base includes an integrally-formed base hinge member and the cover includes a complementary, integrally-formed cover hinge member adapted to receive a hinge pin joining the respective base and cover hinge members for pivotal movement of the base and cover between open and closed positions.

30. A weather-resistant electrical device enclosure according to claim 8, wherein the base includes first and second integrally-formed base hinge members formed on adjacent sides of the base and the cover includes a complementary, integrally-formed cover hinge members formed on adjacent sides of the cover adapted to receive a hinge pin joining the respective base and cover hinge members for pivotal movement of the base and cover between open and closed positions.

31. A weather-resistant electrical device enclosure according to claim 8, wherein the cover has a thickness of 0.11 inch.

32. A weather-resistant electrical device enclosure according to claim 8, wherein the base has a thickness of 0.12 inch.

33. A weather-resistant electrical device enclosure according to claim 8, wherein the cover has a thickness of 0.11 inch and the base has a thickness of 0.12 inch.

* * * * *